(Model.) 2 Sheets—Sheet 1.
T. T. HARRISON.
SULKY PLOW.
No. 255,977. Patented Apr. 4, 1882.
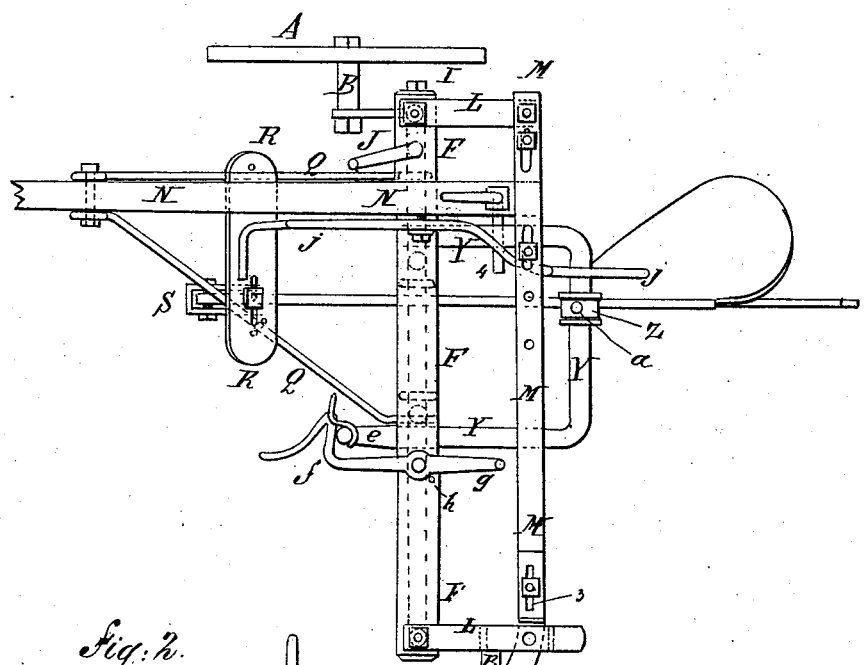
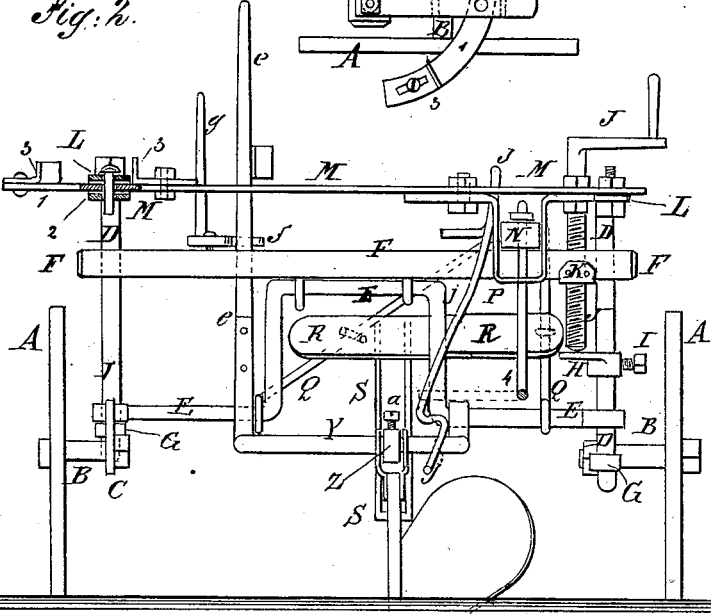
WITNESSES:
Chas. Nida
C. Sedgwick
INVENTOR:
T. T. Harrison
BY Munn & Co
ATTORNEYS.

(Model.)
2 Sheets—Sheet 2.
T. T. HARRISON.
SULKY PLOW.
No. 255,977.
Patented Apr. 4, 1882.
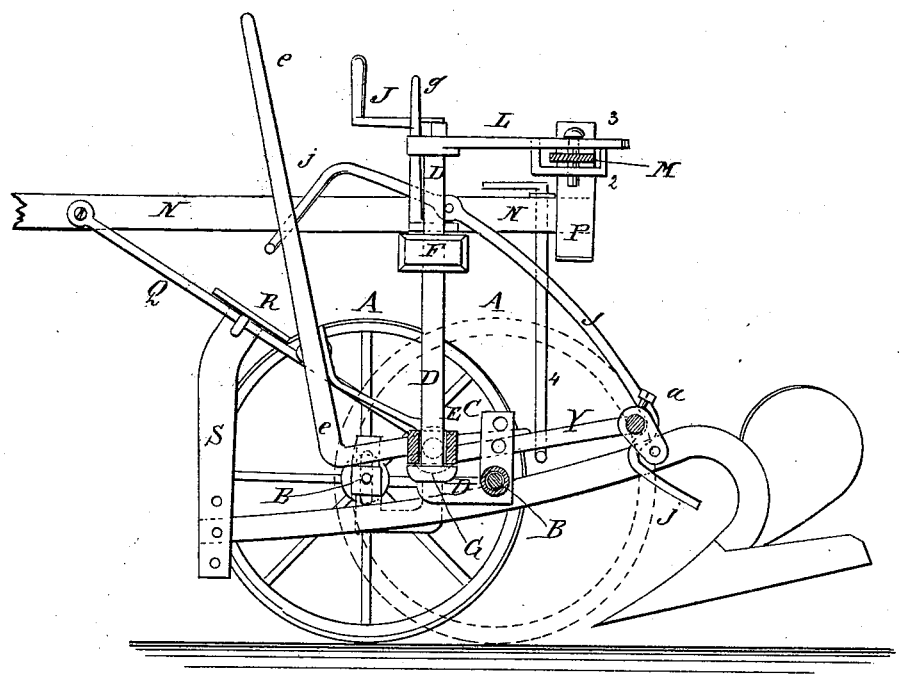
Fig: 3.
WITNESSES:
Chas. Nicla
C. Sedgwick
INVENTOR:
T. T. Harrison
BY Munn & Co
ATTORNEYS.

UNITED STATES PATENT OFFICE.

THOMAS T. HARRISON, OF AUBREY, KANSAS.

SULKY-PLOW.

SPECIFICATION forming part of Letters Patent No. 255,977, dated April 4, 1882.

Application filed October 27, 1881. (Model.)

*To all whom it may concern:*

Be it known that I, THOMAS T. HARRISON, of Aubrey, in the county of Johnson and State of Kansas, have invented a new and useful Improvement in Sulky-Plows, of which the following is a full, clear, and exact description.

Figure 1, Sheet 1, is a plan view of my improvement. Fig. 2, Sheet 1, is a rear elevation of the same, partly in section. Fig. 3, Sheet 2, is a side elevation of the same, partly in section.

The object of this invention is to improve the construction of the sulky-plows for which Letters Patent Nos. 218,734 and 232,268 were issued to me August 19, 1879, and September 14, 1880, respectively, in such a manner as to adapt the machines to turn a square corner without raising the plows from the ground, and also to promote convenience and security in supporting the plows when raised from the ground.

A A are the wheels, the inner ends of the axle arms or spindles B of which are attached to the vertical end parts, C, of the axles D. Several holes are formed in the vertical ends C of the axles D to receive the spindles B, so that the carriage can be adjusted higher or lower, as the height of the plow-beam may require. The axles D at the lower ends of the vertical end parts, C, are bent rearward and then upward, and pass through holes in the ends of the arched bar E and the cross-beam F. The middle part of the cross-beam F rests upon the middle part of the arch or bend of the arched bar E, and is secured to the said arched bar by staples, eyebolts, or other suitable means. When both wheels A of the carriage are running upon a level, as when passing from place to place, the ends of the arched bar E rest upon collars G, formed upon or attached to the axles D. The axle D of the furrow-wheel A passes through a hole in the outer end of an arm, H, which is secured in place adjustably upon the said axle D by a set-screw, I. The inner end of the arm H is widened and flattened to serve as a plate to receive the end of a crank-screw, J, which passes through a nut, K, formed in or attached to the cross-beam F at a little distance from the axle D, so that by turning the crank-screw J the frame of the carriage can be leveled, at whatever depth below the surface of the ground the furrow-wheel may be running.

The axles D can be adjusted with the spindles B in front or in the rear, or one in front and the other in the rear, as may be desired. The upper ends of the axles D are squared to fit into square holes in the forward ends of the short bars L, the rear ends of which are connected with the cross-bar M. The land-side end 1 of the cross-bar M is extended, and is curved forward upon the arc of a circle, and the rear part of the land-side cross-bar L has a keeper, 2, attached to its lower side to receive the curved end 1 of the cross-bar M. With this construction, when the machine is to be turned at a corner of a "land," the curved extension 1 and the keeper 2 allow the wheel A to turn outward, so that as the machine is turned the said wheel will run outward and rearward, bringing the machine into proper position to pass along the next side of the land, the plow serving as a pivot about which the machine swings. This movement also relieves the wheels from strain in turning the machine. The turning movement of the land-side wheel is limited by the stops 3, secured, the one to the bar M and the other to the curved extension 1 of the said bar M. The stops 3 are slotted to receive the fastening-bolts, so that they can be adjusted farther apart or closer together, as may be desired.

N is the tongue, which is secured to the cross-beam F by a staple or other suitable means. The rear end of the tongue N projects in the rear of the cross-beam F, and passes through a loop or stirrup, P, the ends of which are bolted to the cross-bar M, the fastening-bolts passing through slots in the said cross-bar M, so that the cross-bar M can be adjusted to cause the plow to take or leave land, as required. The tongue N is held in position, and is strengthened against side strain by the braces Q, the forward ends of which are bolted to the opposite sides of the said tongue N. The rear ends of the braces Q are secured to the horizontal end parts of the arched bar E.

To the middle parts of the braces Q is secured a plate, R, which serves as a foot-rest for the driver, and which is slotted to receive the bolt that fastens to it the upper end of the loop S.

The loop S is designed to receive the forward end of the plow-beam and to hold the said forward end from lateral movement. The side bars of the loop S have a number of holes formed through them to receive a pin or bolt for preventing the forward end of the plow-beam from rising, and which is designed to be provided with a tubular washer or hollow roller to prevent the plow-beam from being worn.

The rear part of the plow-beam is designed to be connected with the middle part of the crank-bar Y by bars or other suitable connections, which are kept in place upon the said crank-bar Y by one or more collars, Z, placed between the said connections upon the said crank-bar Y, and provided with a set-screw, $a$, so that the plow can be adjusted to cut wider or narrower furrows by adjusting the collar Z upon the crank-bar Y. The ends of the crank-bar Y are hinged to the horizontal end part of the arched bar E.

To the end of one of the arms of the crank-bar Y is secured the rearwardly-projecting lower end of the bent lever $e$, the upper part of which passes up in front of the cross-beam F into such a position that it can be conveniently reached and operated by the plowman from his seat to raise the plow from the ground when desired. To the cross-beam F is pivoted a hook, $f$, to engage with the lever $e$ and lock the said lever in place when holding the plow raised from the ground. The hook $f$ is so formed as to serve also as a stop to limit the play of the lever $e$ when the plow is at work. The hook at $f$ is extended in the rear of its pivot, and the extended rear part, $g$, is bent upward into crank form, so that the said crank-hook can be conveniently operated to release the lever $e$, by the plowman from his seat.

The forward movement of the crank-hook $f$ is limited by a stop-pin, $h$, attached to the cross-beam F for the rear part, $g$, to strike against. To the side of the rear part of the tongue N is pivoted a lever, $j$, the lower part of which is bent to form a shoulder, and its lower end is inclined or curved, as shown in Fig. 3, so as to hook upon the crank-bar Y and support the plow when raised from the ground, and thus relieve the lever $e$ from the strain.

To the rear end of the tongue N is swiveled the upper end or shank of a hook, 4. It hangs in such a position that the arm of the crank-bar Y can be hooked upon it to support the plow when raised from the ground and when the machine is being taken from place to place.

When the hook 4 is not required for use it can be turned around so as to be entirely out of the way of the said crank-bar Y.

Having thus described my invention, I claim as new and desire to secure by Letters Patent—

In a sulky-plow, the combination, with the cross-bar M, having curved extension 1 upon its land-side end, and the bar L, attached to the upper end of the land-side axle D, of the keeper 2 and the stops 3, substantially as herein shown and described, whereby the machine can be turned at a right angle without raising the plow from the ground, as set forth.

THOMAS TROUSDALE HARRISON.

Witnesses:
JAMES A. HARRISON,
WELFORD SMOOTE.